(12) United States Patent
Yoshida et al.

(10) Patent No.: US 6,999,602 B2
(45) Date of Patent: Feb. 14, 2006

(54) IMAGE GENERATION FOR ASSISTANCE OF DRIVERS OF VEHICLES

(75) Inventors: Takashi Yoshida, Ikoma (JP); Nobuhiko Yasui, Moriguchi (JP); Atsushi Iisaka, Katano (JP); Akira Ishida, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 779 days.

(21) Appl. No.: 09/892,741

(22) Filed: Jun. 28, 2001

(65) Prior Publication Data

US 2002/0001399 A1    Jan. 3, 2002

(30) Foreign Application Priority Data

Jun. 30, 2000    (JP)    .............................. 2000-199514

(51) Int. Cl.
    *G06K 9/00*    (2006.01)
(52) U.S. Cl. ...................... 382/104; 382/103
(58) Field of Classification Search ........ 382/103–104, 382/284; 340/901–996, 425.5–490, 146.2, 340/158, 853.6, 572.4; 701/28, 41, 42, 44; 348/119, 148, 149; 116/31, 36
    See application file for complete search history.

(56) References Cited

U.S. PATENT DOCUMENTS

| | | | | |
|---|---|---|---|---|
| 5,214,408 A | * | 5/1993 | Asayama | .................... 340/435 |
| 5,670,935 A | | 9/1997 | Schofield et al. | ........... 340/461 |
| 5,680,123 A | * | 10/1997 | Lee | ............................. 340/937 |
| 5,742,141 A | | 4/1998 | Czekaj | ....................... 318/587 |
| 5,949,331 A | | 9/1999 | Schofield et al. | ........... 340/461 |
| 5,995,903 A | | 11/1999 | Smith et al. | ................ 701/211 |
| 6,285,778 B1 | * | 9/2001 | Nakajima et al. | .......... 382/104 |
| 6,344,805 B1 | * | 2/2002 | Yasui et al. | ............. 340/932.2 |
| 6,366,221 B1 | * | 4/2002 | Iisaka et al. | ............. 340/932.2 |
| 6,463,363 B1 | * | 10/2002 | Okuda | ........................... 701/1 |
| 2003/0222983 A1 | * | 12/2003 | Nobori et al. | .............. 348/148 |

FOREIGN PATENT DOCUMENTS

| | | |
|---|---|---|
| EP | 1 030 188 | 8/2000 |
| JP | 8-48198 | 2/1996 |
| JP | 09-054898 | 2/1997 |
| JP | 10-175482 | 6/1998 |
| JP | 11-78692 | 3/1999 |
| JP | 11-334470 | 12/1999 |
| WO | 00/07373 | 2/2000 |

* cited by examiner

*Primary Examiner*—Andrew W. Johns
*Assistant Examiner*—Patrick L. Edwards
(74) *Attorney, Agent, or Firm*—Wenderoth, Lind & Ponack, L.L.P.

(57) ABSTRACT

In a rendering device Urnd1, a CPU 7 receives a captured image each from two image capture devices 1 and 2. The CPU 7 then receives a steering angle of a steering wheel of a vehicle from a steering angle sensor 3. Based on the steering angle, the CPU 7 derives an estimated trajectory for the vehicle to take in the course of time. Then, with reference to the estimated trajectory, the CPU 7 selects several pixels each from the captured images, and then generates a drive assistant image based on those pixels. In this manner, the drive assistant image generated by the rendering device Urnd1 hardly causes the driver to feel strange.

9 Claims, 15 Drawing Sheets

FIG. 13

| RECORD TYPE Trcd | COORDINATE VALUES (ub, vb) | ID NUMBER ID | COORDINATE VALUES (ua, va) | STEERING ANGLE RANGE Rrng | BLENDING RATIO Rbrd | |
|---|---|---|---|---|---|---|
| ⋮ | ⋮ | ⋮ | ⋮ | ⋮ | ⋮ | |
| 1 | (501, 109) | #2 | (551, 303) | – | 1 | }Rnt |
| ⋮ | ⋮ | ⋮ | ⋮ | ⋮ | ⋮ | |
| 2 | (324, 831) | #1 | (1011, 538) | Rrng1; $0 \leq \rho \leq \rho$ th, $\rho$ th= $\Delta \rho$ | Rbrd1=0 | }Rnt |
| | | | | Rrng2; $\rho$ th< $\rho$, $\rho$ th= $\Delta \rho$ | Rbrd2=1 | |
| | | #2 | (668, 629) | Rrng1; $0 \leq \rho \leq \rho$ th, $\rho$ th= $\Delta \rho$ | Rbrd3=1 | |
| | | | | Rrng2; $\rho$ th< $\rho$, $\rho$ th= $\Delta \rho$ | Rbrd4=0 | |
| ⋮ | ⋮ | ⋮ | ⋮ | ⋮ | ⋮ | |
| 2 | (971, 1043) | #1 | (1189, 999) | Rrng1; $0 \leq \rho \leq \rho$ th $(=2 \times \Delta \rho)$ | Rbrd1=0 | }Rnt |
| | | | | Rrng2; $\rho$ th $(=2 \times \Delta \rho)< \rho$ | Rbrd2=1 | |
| | | #2 | (1135, 798) | Rrng1; $0 \leq \rho \leq \rho$ th $(=2 \times \Delta \rho$ | Rbrd3=1 | |
| | | | | Rrng2; $\rho$ th $(2 \times \Delta \rho)< \rho$ | Rbrd4=0 | |
| ⋮ | ⋮ | ⋮ | ⋮ | ⋮ | ⋮ | |

Nu × Nv (PIXEL)

Tmp

IMAGE GENERATION FOR ASSISTANCE OF DRIVERS OF VEHICLES

BACKGROUND OF THE INVENTION

1. Field of the Invention

The present invention relates to rendering devices and, more specifically, to a rendering device which can be incorporated in a drive assistant device. In more detail, the rendering device generates a drive assistant image of an area around a vehicle based on images captured by image capture devices securely placed in the vehicle.

2. Description of the Background Art

The image capture devices 1001 to 1008 are directed in each different direction to cover the entire area around the vehicle Vur, and are responsible for image capturing. The resulting images are referred to as captured images S101 to S108, which are stored in the image memories 1009 to 1016, respectively. From several specific captured images stored in any predetermined image memory among those 1009 to 1016, the image processing part 1017 partially cuts out any required part. The parts are stitched together to have a single surrounding image S200 (see FIG. 19). The surrounding image S200 is then displayed on the display device 1018.

The image capture devices 1001 to 1008 are directed in each different direction to cover the entire area around the vehicle Vur, and have charge of image capturing. The resulting images are referred to as captured images S101 to S108, which are stored in the image memories 1009 to 1016, respectively. From several specific captured images stored in any predetermined image memory among those 1009 to 1016, the image processing part 1017 partially cuts out any required part. The parts are stitched together to have a single surrounding image S200 (see FIG. 19). The surrounding image S200 is then displayed on the display device 1018.

Here, FIG. 19 shows an example of the surrounding image S200 generated by the image processing part 1017 in the above manner. In FIG. 19, the surrounding image S200 is composed of partial images S106' to S108', which are respectively cut out from the captured images S106 to S108. The partial image S108' occupies a left-side region R2001 of the surrounding image S200. The partial images S107' and S106' occupy, respectively, a center region R2002 and a right-side region R2003 of the surrounding image S200. Here, for convenience, a boundary between the left-side region R2001 and the center region R2002 is referred to as a seam boundary B2001, which is denoted by a dotted line in FIG. 19.

As another example of the conventional drive assistant device, there is a device for monitoring a surrounding area of a vehicle disclosed in International Publication WO00-07373. The monitoring device carries a plurality of image capture devices, which are responsible for image capturing of each different region and cover the entire region around the vehicle. The resulting images captured by those image capture devices are now referred to as captured images, and each show the region around the vehicle for which it is responsible.

Based on those captured images, the monitoring device generates a surrounding image showing the vehicle and the area therearound viewed from above. To be more specific, since the captured images are the ones viewed from the image capture devices, the viewpoint conversion processing is carried out to generate the surrounding image viewed from the above. In the above viewpoint conversion processing, every object in the captured images is assumed as lying on the road surface to reduce the CPU load. The objects are projected on to the road surface to generate spatial data, which is utilized to generate one surrounding image by stitching a plurality of captured images together.

The above two image drive assistant devices both bear problems. Described first is the problem unsolved by the first-mentioned drive assistant device. The surrounding image S200 thus derived by the conventional drive assistant device bears a problem of image distortion, which is evident especially on the seam boundary B2001. Generally, there are various many objects (typically, walls and other vehicles) around the vehicle Vur, and thus those often locate on the seam boundary B2001 in the surrounding image S200. Assuming here is a case where a wall W200 is located on the seam boundary B2001 as shown in FIG. 19. In this case, the wall W200 appears both in the captured images S107 and S108. Since the image capture devices 1007 and 1008 are mounted in each different position, the wall W200 is viewed from different directions. Therefore, the wall W200 resultantly looks distorted in the surrounding image S200, especially in the vicinity of the seam boundary B2001. Therefore, the surrounding image S200 displayed on the display device 1018 problematically causes a driver of the vehicle to feel strange.

The problem unsolved by the above-mentioned monitoring device is not displaying an image of an area that correctly resembles the area. This problem is evident especially on the surrounding image wherein objects displayed in the image do not correctly resemble corresponding objects in the surrounding area. More specifically, as shown in FIG. 20A, presumably, placed on a road surface Frd is an object B, a cross section of which is reverse "L" shaped. In the above viewpoint conversion processing, as shown in FIG. 20B, the object B is viewed from viewpoints of image capture devices 2001 and 2002, and projected onto the road surface Frd therefrom. As a result, virtual objects B' and B" are obtained. Therefore, the spatial data resultantly generated from the captured image derived by the image capture device 2001 includes the virtual object B' as the object B, while the spatial data from the captured image 2002 includes the virtual object B".

By utilizing such two spatial data, the monitoring device generates one surrounding image. The issue here is, since the two spatial data include the virtual objects B' and B" each have different shape, the monitoring device problematically cannot correctly render the object B, and the resulting object B is not correctly displayed. As a result, the surrounding image generated by such monitoring device causes the driver to feel strange.

SUMMARY OF THE INVENTION

Therefore, an object of the present invention is to provide a rendering device, a drive assistant image generated thereby hardly causing a driver of the vehicle feel strange.

The present invention has the following features to attain the object above.

An aspect of the present invention is directed to a rendering device for generating a drive assistant image of around a vehicle for drive assistance. The vehicle includes a steering angle sensor for detecting a steering angle of the vehicle, and a plurality of image capture devices each for image capturing an area around the vehicle. Here, the images captured thereby include an overlapped region. The above rendering device comprises an image receiving part for receiving the images captured by each of the image capture devices; a steering angle receiving part for receiving the steering angle detected by the steering angle sensor; and an image processing part for performing pixel selection from the captured images received by the image receiving part according to the steering angle received by the steering angle receiving part, and based on a result of the pixel selection, generating the drive assistant image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram showing the detailed structure of a mapping table Tmp of FIG. 1;

DESCRIPTION OF THE PREFERRED EMBODIMENT

Figure 1:
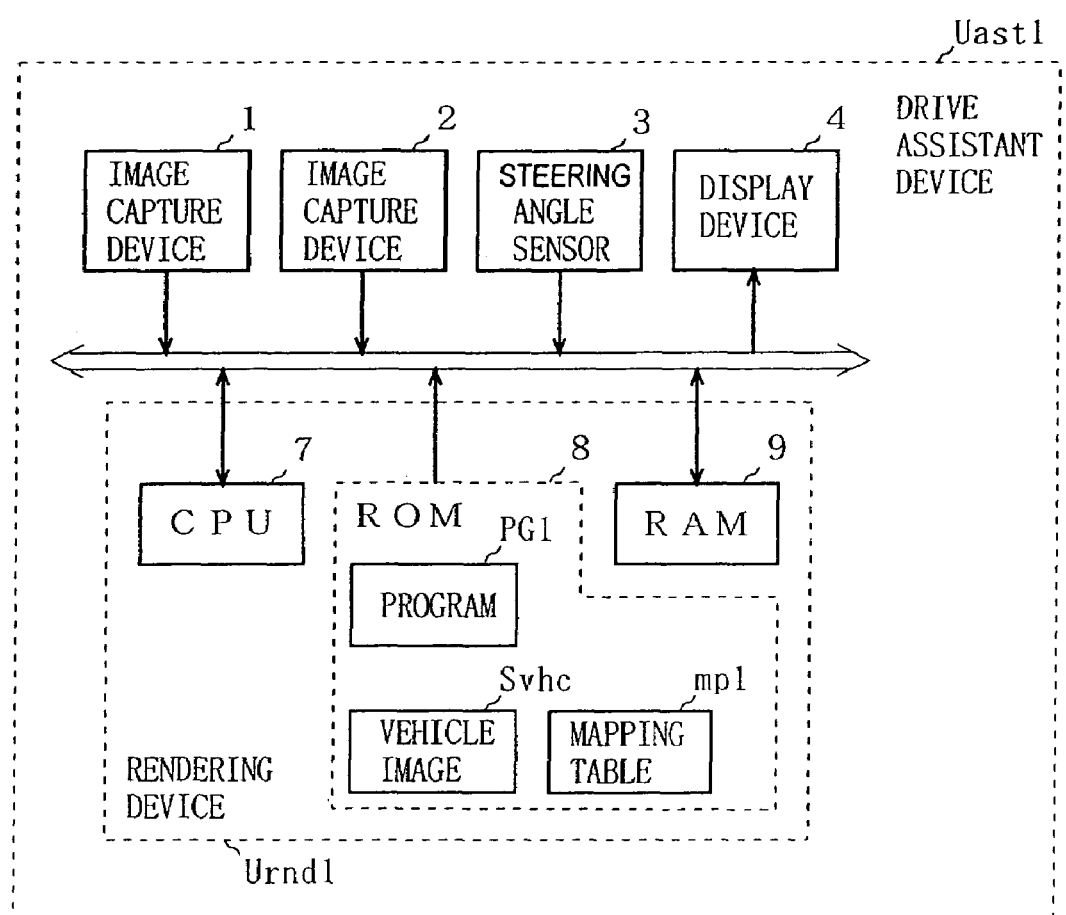
FIG. 1 is a block diagram showing the hardware structure of a drive assistant device Uast1 according to an embodiment of the present invention.

FIG. 1 is a block diagram showing the hardware structure of a drive assistant device Uast1 incorporating a rendering device Urnd1 according to an embodiment of the present invention. In FIG. 1, the drive assistant device Uast1 is mounted in a vehicle Vur (see FIG. 2), and includes two image capture devices 1 and 2, a steering angle sensor 3, a display device 4, and the rendering device Urnd1.

Figure 2:
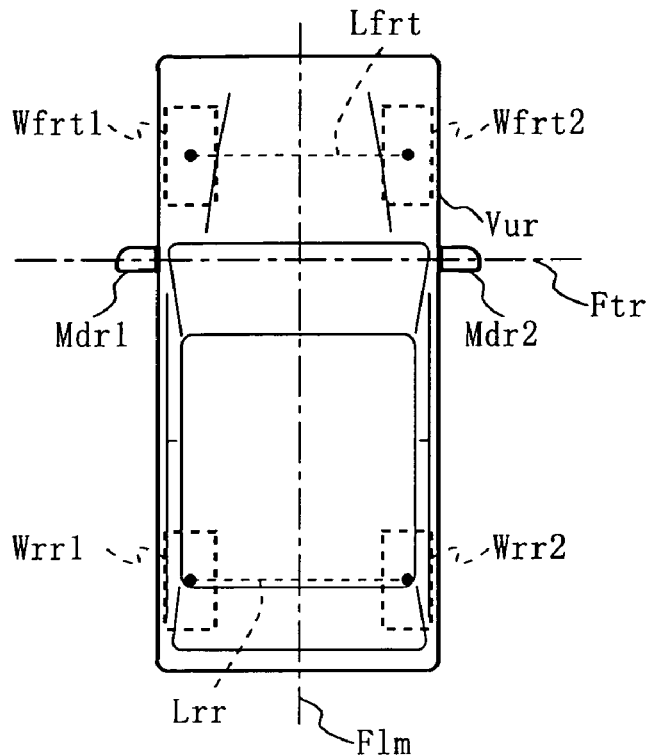
FIG. 2 is a top view of a vehicle Vur including the drive assistant device Uast1 of FIG. 1.

Here, FIG. 2 shows a top view of the vehicle Vur for illustrating a longitudinal median plane Flm and a lateral datum plane Ftr to be mentioned below. In FIG. 2, the longitudinal median plane Flm is a vertical plane passing through both a midpoint of a line segment Lfrt between rotation centers of the front wheels Wfrt1 and Wfrt2 of the vehicle Vur, and another midpoint of a line segment Lrr between rotation centers of the rear wheels Wrr1 and Wrr2. The lateral datum plane Ftr is also a vertical plane orthogonal, at least, to the longitudinal median plane Flm, and traversing the vehicle Vur. In the present embodiment, for convenience, the lateral datum plane Ftr presumably passes through two door mirrors Mdr1 and Mdr2.

Figure 3:
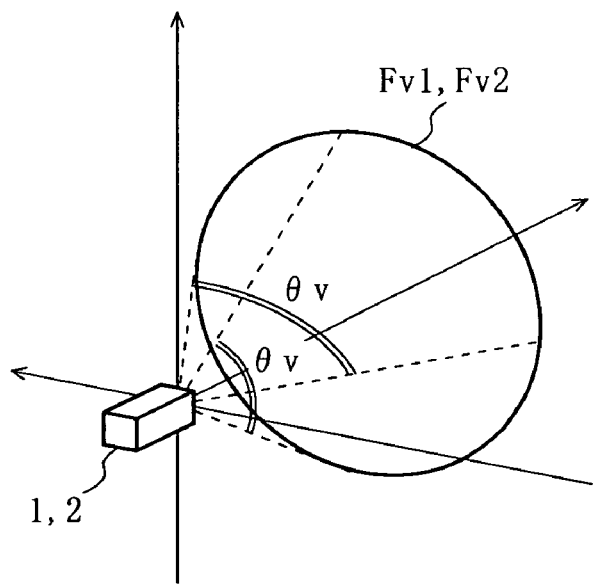
FIG. 3 is a diagram showing viewing angles θv and viewfields Fv of, respectively, image capture devices 1 and 2 of FIG. 1.

As shown in FIG. 3, the image capture devices 1 and 2 each have a viewing angle of θv exceeding 90 degrees. Considering practicality and cost of the drive assistant device Uast1, the preferable viewing angle θv is 110 to 130 degrees. Herein, although not necessarily the same, the viewing angle θv is presumably the same between the image capture devices 1 and 2 for convenience. In the below, the viewfields of the image capture devices 1 and 2 provided by the viewing angle θv are referred to as viewfields Fv1 and Fv2, respectively.

Figure 4:
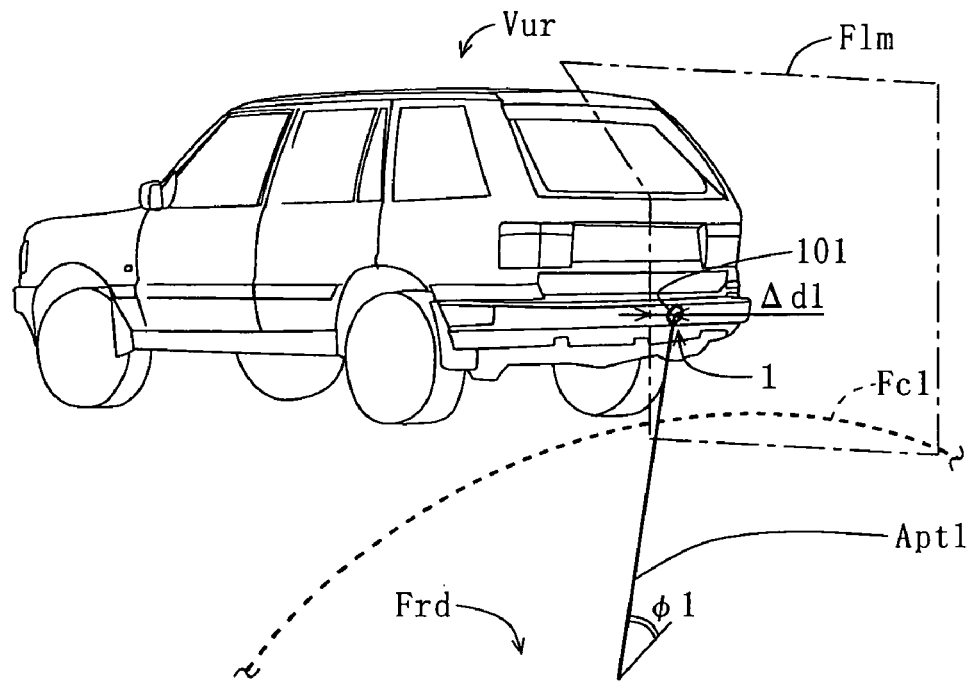
FIG. 4 is a diagram showing the mounting position of the image capture device 1 of FIG. 1.
Figure 5:
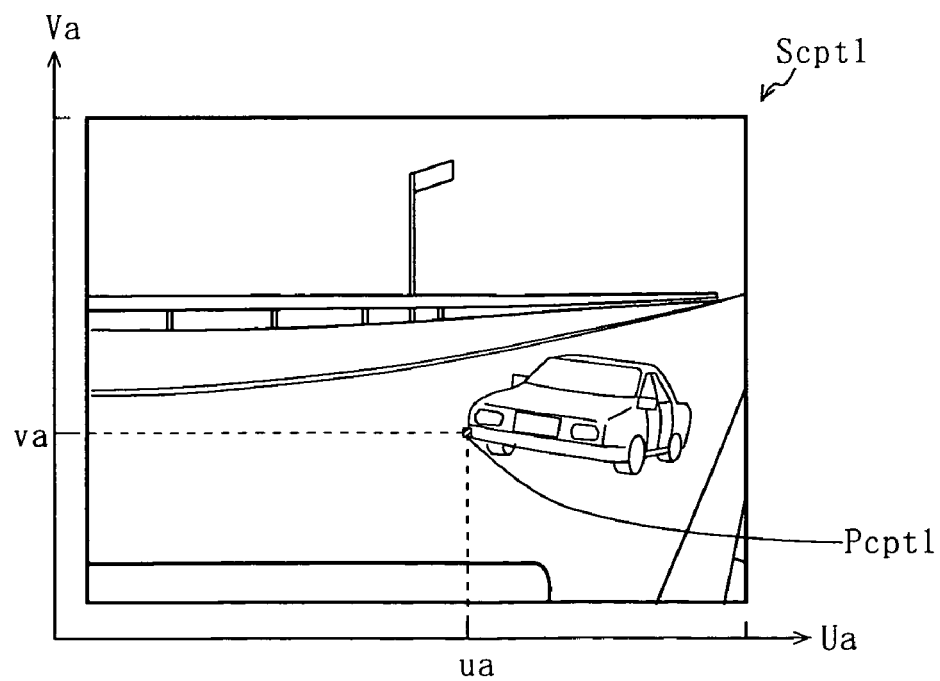
FIG. 5 is a diagram showing an exemplary captured image Scpt1 captured by the image capture device 1 of FIG. 1.

The image capture devices 1 and 2 are securely mounted on the perimeter of the vehicle Vur. As shown in FIG. 4, the image capture device 1 is securely mounted in the vicinity of the rear end (e.g. rear bumper) of the vehicle Vur. More specifically, the image capture device 1 is so mounted that a vertex of its lens 101 is located with a predetermined space Δd1 to the right from the longitudinal median plane Flm. An optical axis Apt1 of the image capture device 1 is directed from the vertex of the lens 101 to a region left rear of the vehicle Vur, and forms an angle of φ1 with a road surface Frd. Thus formed intersection plane Fc1 of the road surface Frd and the viewfield Fv1 (see FIG. 3) is captured by the image capture device 1, and a resulting image is a captured image Scpt1 as shown in FIG. 5. In FIG. 5, the captured image Scpt1 has pixels Pcpt1 of a predetermined number. The pixels Pcpt1 are each positionally defined by coordinate values (ua, va) in a first UV coordinate system which consists of Ua and Va axes. Here, as a specific example, only one of the pixels Pcpt1 is shown in FIG. 5.

Described next is the angle φ1 about what value is considered appropriate therefor. The angle φ1 closer to 0 degree allows the image capture 1 only to cover a region far from the vehicle Vur. That means, the image capture device 1 cannot capture the driver's blind spot, which is an area underneath the rear end of the vehicle Vur on the road surface Frd. Conversely, with the angle φ1 closer to 90 degrees, the image capture device 1 cannot cover the region far from the vehicle Vur on the road surface Frd. In other words, when the angle φ1 is closer to 90 degrees, the captured image Scpt1 hardly include any obstacle. This is because the driver generally avoid obstacles blocking his/her way, and thus there is no obstacle in the close range to the vehicle Vur. As such, also with the height of the lens 101 from the road surface Frd and the viewing angle θv considered, the angle φ1 is set to a value considered appropriate.

Figure 6A:
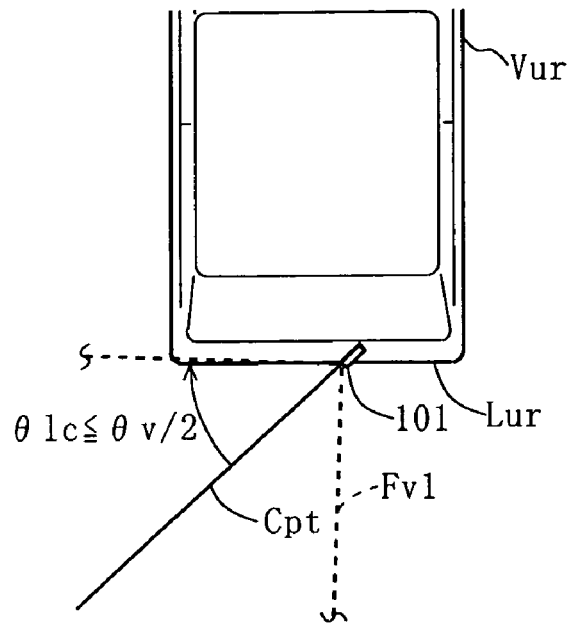
FIGS. 6A and 6B show diagrams showing a preferable and non-preferable directions of a lens 101 shown in FIG. 5.
Figure 6B:
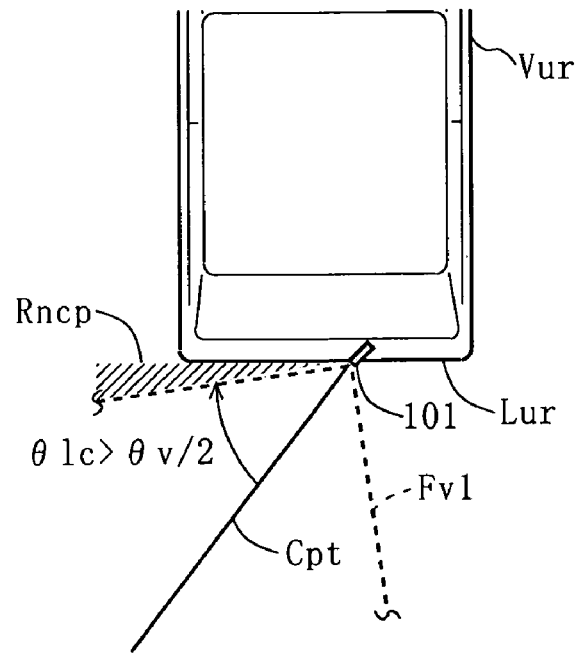

Described next is the optical axis Apt1 about which direction is considered appropriate therefor. Here, FIGS. 6A and 6B each show a top view of the area proximal to the lens 101 of FIG. 4. Specifically, FIG. 6A shows a body line Lur and a component Cpt together with the viewfield Fv1. The body line Lur is the one outlining the rear end of the vehicle Vur, and presumably not curvy but linear for convenience. The component Cpt is a horizontal component of a vector of the optical axis Apt1 (not shown). The optical axis Apt1 is so directed that an angle of θ1c formed by the component Cpt and the body line Lur is θv/2 or smaller. The viewfield Fv1 is thereby so directed as to extend over or along the body line Lur, and the image capture device 1 covers, without fail, the area underneath the rear end of the vehicle Vur on the road surface Frd (the driver's blind spot). As shown in FIG. 6B, if the angle θ1c exceeds θv/2, the image capture device 1 cannot cover a region Rncp (hatched part) underneath the rear end of the vehicle Vur, and thus considered not preferable.

Figure 7:
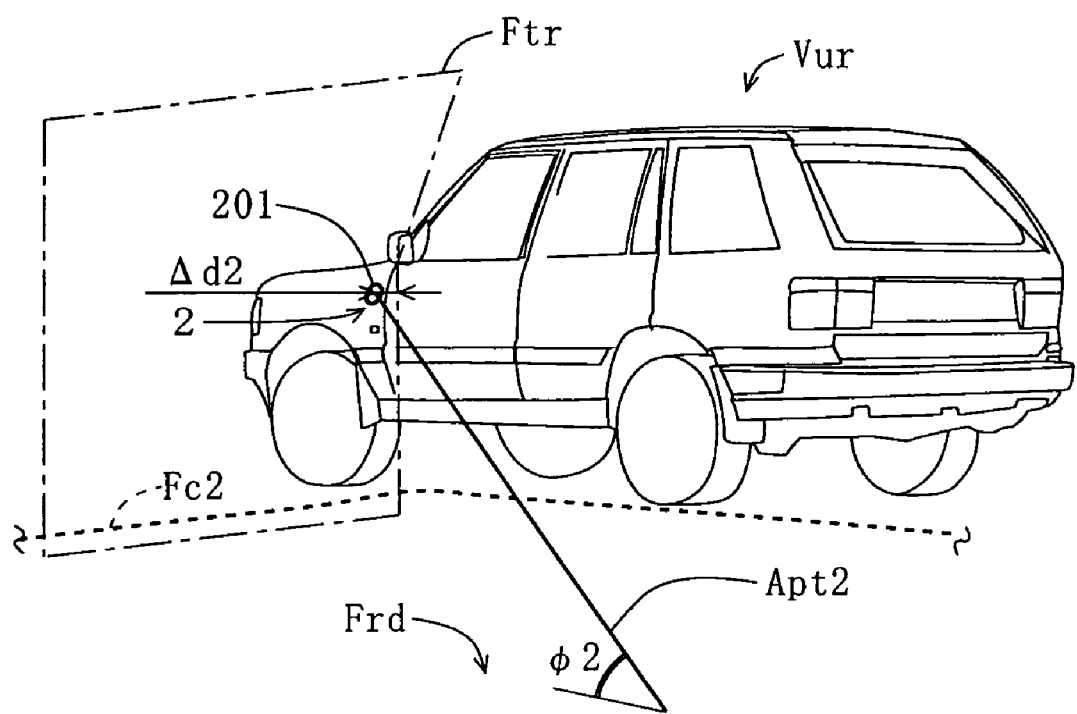
FIG. 7 is a diagram showing the mounting position of the image capture device 2 of FIG. 2.

As shown in FIG. 7, the image capture device 2 is securely mounted on the left-side plane of the vehicle Vur (e.g., in the vicinity of the left door mirror Mdr1) (refer to FIG. 2). More specifically, the image capture device 2 is preferably so mounted that a vertex of its lens 201 is located with a predetermined space Δd2 toward the front of the vehicle Vur with respect to the lateral datum plane Ftr. An optical axis Apt2 of the image capture device 2 is directed from the vertex of the lens 201 to a region left rear of the vehicle Vur, and forms an angle of φ2 with the road surface Frd. Thus formed intersection plane Fc2 of the road surface Frd and the viewfield Fv2 (see FIG. 3) is captured by the image capture device 2, and a resulting image is a captured image Scpt2. Other than showing the intersection plane Fc2, the captured image Scpt2 is the same as the captured image Scpt1, and thus not described again. Here, the captured image Scpt2 has a predetermined number of pixels Pcpt2, which are also each positionally defined by the above-mentioned coordinate values (ua, va).

Here, the angle φ2 is set to a value considered appropriate. What considered appropriate here is whether the image capture device 2 covers the area underneath the left end of the vehicle Vur, and captures any obstacle located away from the vehicle Vur to some extent. Considered here also are the height of the lens 102 from the road surface Frd and the viewing angle θv.

The optical axis Apt2 is preferably directed, similar to the optical axis Apt1, so that the viewfield Fv2 extends over or along the left-side plane of the vehicle Vur. The image capture device 2 thereby covers, without fail, the area underneath the left-side plane of the vehicle Vur on the road surface Frd (the driver's blind spot).

Figure 8:
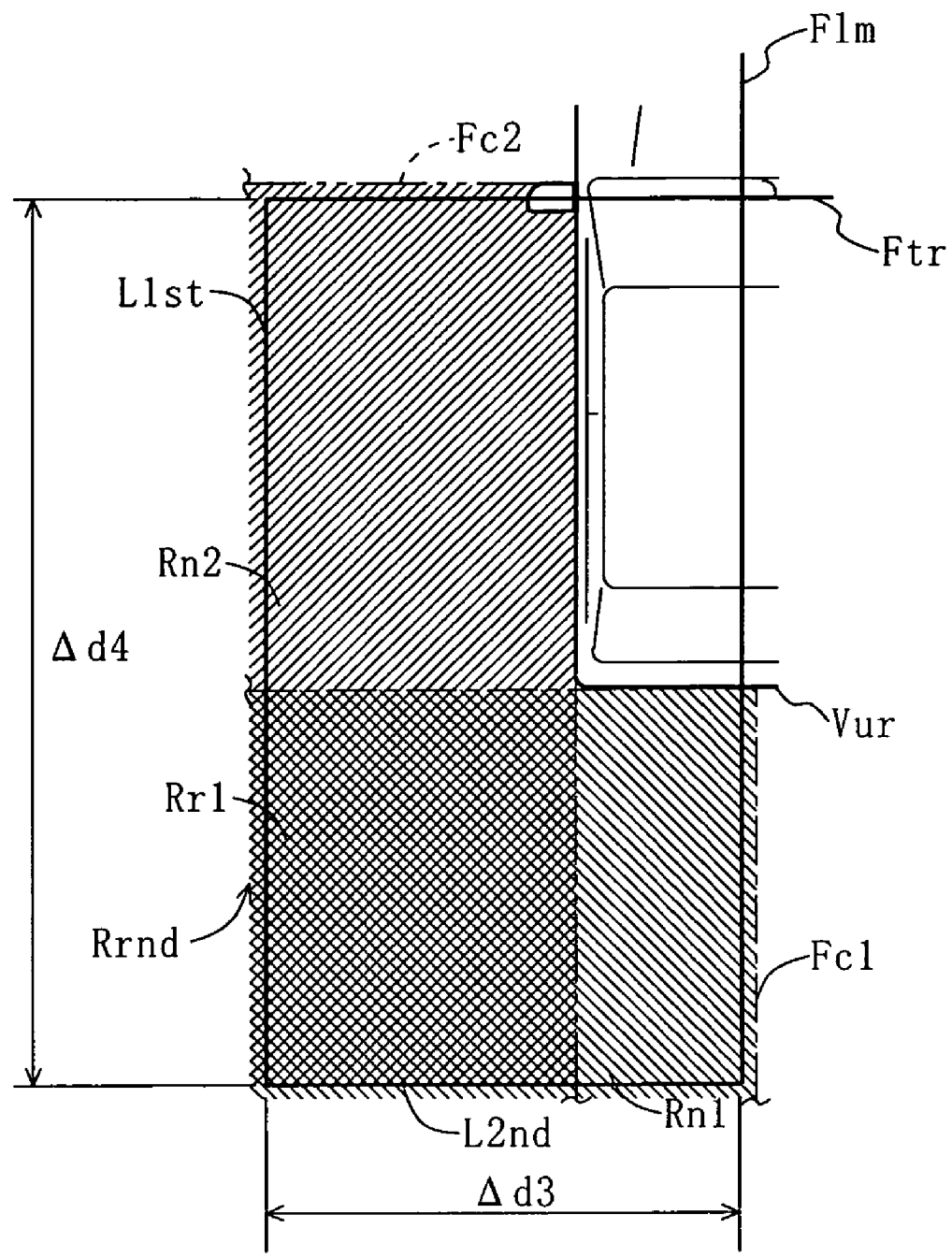
FIG. 8 is a diagram showing an overlapped region Rr1, and non-overlapped regions Rn1 and Rn2 formed in relation to the viewfields Fv of the image capture devices 1 and 2 of FIG. 1.

As already described, the viewing angle θv of the image capture devices 1 and 2 exceeds 90 degrees. Thus, as shown in FIG. 8, the intersection plane Fc1 (see a back-slashed part) overlaps the intersection plane Fc2 (see a slashed part), and the overlapped part is referred to as a overlapped region Rr1 (see a crisscrossed part). The overlapped region Rr1 appears both in the captured images Scpt1 and Scpt2. In the below, a region not belonging to the overlapped region Rr1 in the intersection plane Fc1 is referred to as a non-overlapped region Rn1. Similarly, a non-overlapped region Rn2 is a region where the intersection plane Fc2 does not overlap with the intersection plane Fc1.

As will be described later, the drive assistant device Uast1 generates a drive assistant image Sast (see FIG. 10) showing a rendering region Rrnd viewed from above. Here, in FIG. 8, the rendering region Rrnd is a region on the road surface Frd enclosed by the longitudinal median plane Flm, the lateral datum plane Ftr, and two sides of L1*st* and L2*nd*. The side L1*st* is orthogonal to the lateral datum plane Ftr, and parallel to the longitudinal median plane Flm. The side L1*st* is away from the longitudinal median plane Flm by a predetermined space Δd3. The side L2*nd* is parallel to the lateral datum plane Ftr, and orthogonal to the longitudinal median plane Flm. The side L2*nd* is away from the lateral datum plane Ftr by a predetermined space Δd4. Here, the spaces Δd3 and Δd4 are arbitrarily set depending on the design specifications of the drive assistant device Uast1, for example, 4 m and 7 m, respectively. With such spaces Δd3 and Δd4, the rendering region Rrnd partially includes the non-overlapped regions Rn1 and Rn2 as well as the overlapped region Rr1.

In FIG. 1, the steering angle sensor 3 detects a steering angle ρ of the steering wheel of the vehicle Vur. The detected steering angle ρ is transmitted to a processor 1. The steering angle ρ indicates at what angle the steering wheel is turned with respect to the initial position. The steering wheel is considered in the initial position, preferably, when not turned, that is, when the vehicle Vur is in the straight-ahead position. In this embodiment, the steering angle ρ is positive when the steering wheel is turned left, that is, when the vehicle Vur moves backward and rotates clockwise. Conversely, when the steering wheel is turned right, the steering angle ρ is negative. This will be mentioned in the last of the present embodiment.

In FIG. 1, the display device 4 is typically a liquid crystal display. The rendering device Urnd1 includes a CPU 7, ROM 8, and RAM 9. The CPU executes image processing on the captured images Scpt1 and Scpt2, and generates a frame of the drive assistant image Sast.

Figure 9:
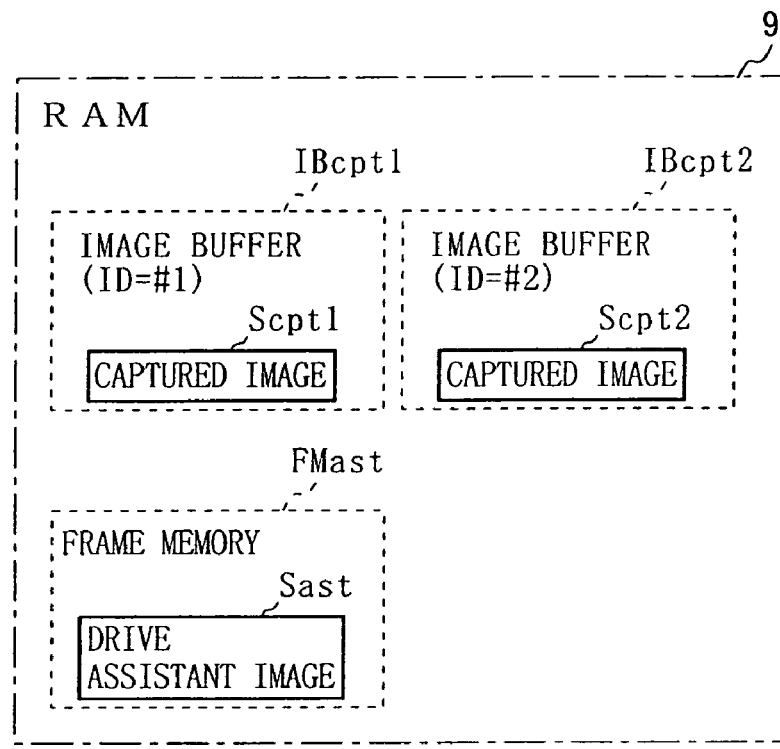
FIG. 9 is a diagram showing image buffers IBcpt1 and IBcpt2, and frame memory FMast reserved in RAM 9 of FIG. 1.

At the time of image processing, the CPU 7 uses the RAM 9 as a working area. As shown in FIG. 9, in the RAM 9, image buffers IBcpt1 and IBcpt2, and frame memory FMast are reserved. The image buffer IBcpt1 is unchangeably allocated to the image capture device 1, and stores the captured image Scpt1 (see FIG. 5). That is, the image buffer IBcpt1 is so structured as to store values of the pixels Pcpt1 in the captured image Scpt1 in a manner corresponding to the coordinate values (ua, va) in the first UV coordinate system on a one-to-one basis. The image buffer IBcpt2 is allocated to the image capture device 2, and structured similarly to the image buffer IBcpt1 for storing values of the pixels Pcpt2 in the captured image Scpt2.

Further, the image buffers IBcpt1 and IBcpt2 are each assigned to different ID number. In the present embodiment, the image buffer IBcpt1 is assigned #1, and the image buffer IBcpt2 #2, for example. As the image buffers IBcpt1 and IBcpt2 are allocated to the image capture devices 1 and 2, respectively, the ID numbers #1 and #2 also specify the image capture devices 1 and 2.

Figure 10:
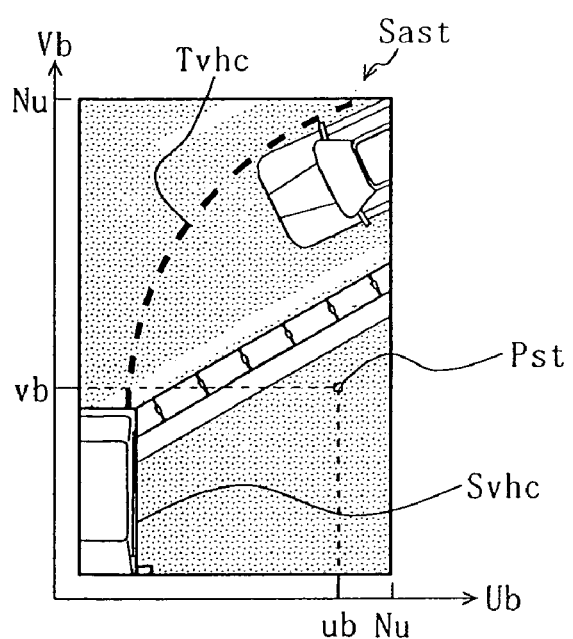
FIG. 10 is a diagram showing an exemplary drive assistant image Sast generated by a CPU 7 of FIG. 1.
Figure 11:
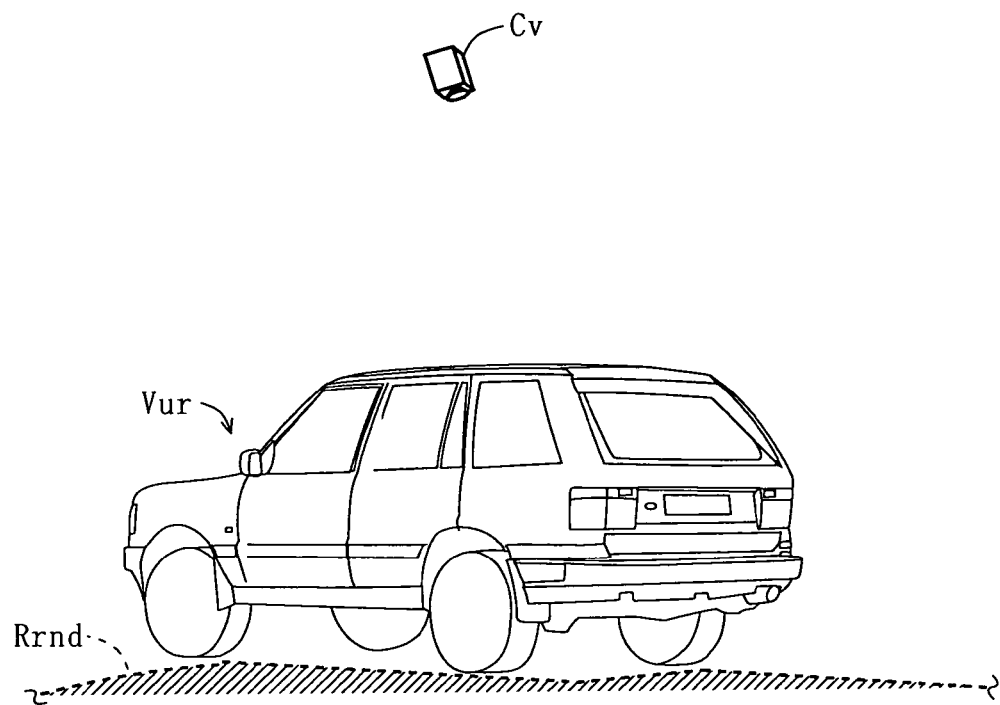
FIG. 11 is a diagram showing a virtual camera Cv needed for generating the drive assistant image Sast of FIG. 10.

As shown in FIG. 10, the drive assistant image Sast shows the area left rear of the vehicle Vur. More specifically, as shown in FIG. 11, the drive assistant image Sast shows the rendering region Rrnd viewed from a virtual camera Cv virtually placed above the vehicle Vur. Such drive assistant image Sast shows the driver in what state the blind spot near the left rear corner of the vehicle Vur, and whether there is any obstacle in the area left rear of the vehicle Vur. Further, as shown in FIG. 10, the drive assistant image Sast has Nu pixels Pst in an Ub-axis direction in a second UV coordinate system, and Nv pixels Pst in a Vb-axis direction. That is, the drive assistant image Sast has (Nu×Nv) pixels Pst in total. The pixels Pst are each specified by coordinate values (ub, vb). Here, the coordinate values ub and vb are both natural numbers satisfying 1<=ub<=Nu and 1<=vb<=Nv, respectively.

In the present embodiment, as one preferable example, the drive assistant image Sast includes a vehicle image Svhc, which shows the vehicle Vur viewed from above as shown in FIG. 10. With the vehicle image Svhc included in the drive assistant image Sast, the driver can understand the distance from vehicle Vur to a specific obstacle. Here, the vehicle image Svhc is overlaid to an overlaying position Pvy specified by at least a set of coordinates (uvy, vvy) in the above second UV coordinate system (not shown). Here, the coordinate value uvy on the Ub-axis satisfies 1<=uvy<=Nu, and the coordinate value vvy on the Vb-axis satisfies 1<=vvy<=Nu.

The drive assistant image Sast also includes, preferably, an estimated trajectory Tvhc for a left-rear wheel of the vehicle Vur (see FIG. 10). Here, the estimated trajectory Tvhc is derived based on the steering angle ρ detected by the steering angle sensor 3 under a technique typified by Ackermann's model. The estimated trajectory Tvhc is to be traced by the left-rear wheel of the vehicle Vur on condition that the driver keeps the steering wheel at the currently derived steering angle ρ. With the estimated trajectory Tvhc included in the drive assistant image Sast, the driver can easily judge whether the left-rear part of the vehicle Vur is likely to hit any obstacle in the close range.

The frame memory FMast is used to generate such drive assistant image Sast, and so structured as to store values of the (Nu×Nv) pixels Pst in the rendering region Rrnd.

In FIG. 1, the ROM 8 stores a program PG1, the vehicle image Svhc, and a mapping table Tmp. The program PG1 includes the processing procedure for the CPU 7 to generate the drive assistant image Sast. The vehicle image Svhc shows, as described above, the vehicle Vur viewed from above.

Figure 12:
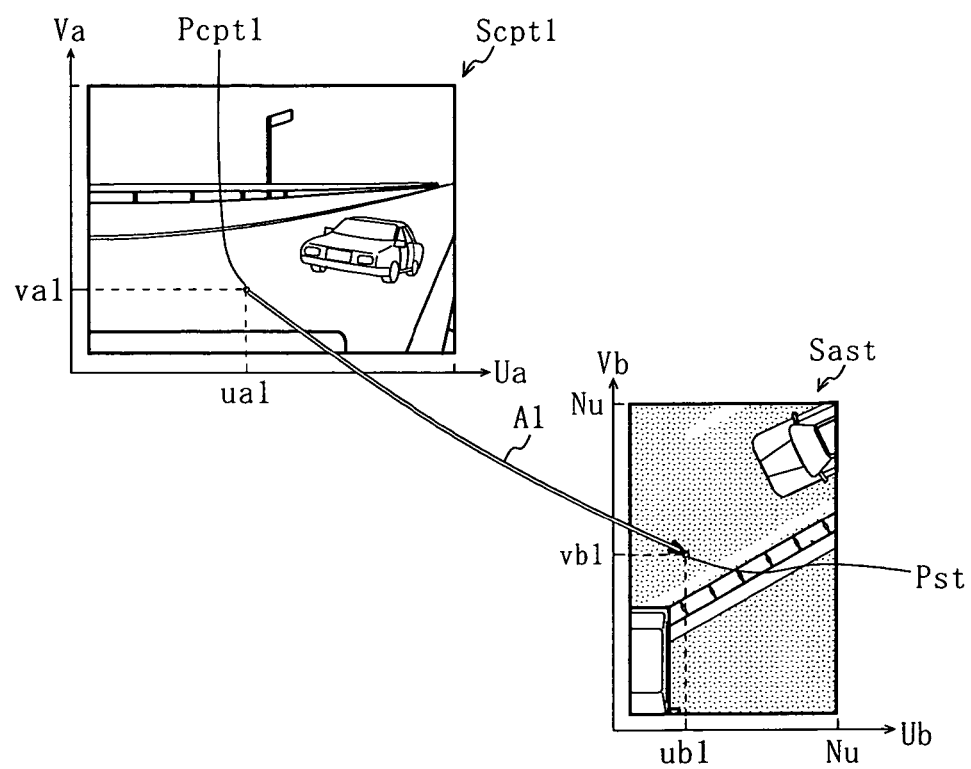
FIG. 12 is a diagram for schematically illustrating image processing carried out by the CPU 7 of FIG. 1.

Described next is the mapping table Tmp. In the above image processing, the CPU 7 selects several of the pixels Pcpt1 and Pcpt2 from the captured images Scpt1 and Scpt2. At the time of selection, the mapping table Tmp is referred to see, for example, the correspondence between one pixel Pcpt1 at coordinates (ua1, va1) in the captured image Scpt1 and one pixel Pst at coordinates (ub1, vb1) in the drive assistant image Sast. Then, the value of the pixel Pst is determined by the value of the corresponding pixel Pcpt1. The correspondence is schematically indicated by an arrow A1 in FIG. 12.

Note as to the mapping table Tmp, the captured image Scpt1 and the drive assistant image Sast are not viewed from the same viewpoint. Specifically, the captured image Scpt1 is viewed from the lens 101 of the image capture device 1, while the drive assistant image Sast is from the lens of the virtual camera Cv (see FIG. 11). Therefore, there needs to carry out viewpoint conversion processing when the drive assistant image Sast is generated. Herein, the drive assistant device Uast1 applies the technique disclosed in the International Publication WO00-07373. The viewpoint conversion processing is thus carried out simultaneously with pixel selection with reference to the mapping table Tmp.

As shown in FIG. 13, the mapping table Tmp includes (Nu×Nv) unit records Rn1, and show the correspondence between the pixels Pst in the drive assistant image Sast and the pixels Pcpt1 and/or Pcpt2 in the captured images Scpt1 and/or Scpt2. The unit records Rnt are each uniquely assigned to each of the pixels Pst in the drive assistant image Sast, and composed of a record type Trcd, the coordinate values (ub, vb) in the second UV coordinate system, the ID number, the coordinate values (ua, va) in the first UV coordinate system, a steering angle range Rrng, and a blending ratio Rbrd.

The record type Trcd indicates the type of the unit record Rnt by either "1" or "2". Here, "1" is assigned to the above described non-overlapped regions Rn1 and Rn2, while "2" the overlapped region Rr1. That is, in the mapping table Tmp, "1" assigned to the unit record Rnt indicates that the pixel Pst belongs to the non-overlapped region Rn1 or Rn2, while "2" indicates the pixel Pst belonging to the overlapped region Rr1.

The coordinate values (ub, vb) indicate to which pixel Pst the unit record Rnt is assigned. As an example, for a unit record Rnt including coordinate values (501, 109), a corresponding pixel Pst is the one 501st in the Ub-axis direction and 109th in the Vb-axis direction. As another example, for a unit record Rnt including coordinate values (324, 831), a corresponding pixel Pst is the one 324th in the Ub-axis direction and 831st in the Vb-axis direction.

The ID number takes either "1" or "2" as described above, and specifies the image capture devices 1 and 2. That is, in the record unit Rnt, the ID number specifies the captured images Scpt1 and Scpt2 to which the pixel Pst at the coordinates (ub, vb) belongs. Note as to the ID number, the unit record Rnt includes two ID numbers for a set of coordinate values (ub, vb) if the record type Trcd therein is assigned "2". With "1" assigned to the record type Trcd, on the other hand, the ID number and a set of coordinate values (ub, vb) have a one-to-one relationship.

For example, the unit record Rnt including the coordinate values (501, 109) indicates the ID number "2". Accordingly, a pixel corresponding to the pixel Pst at the coordinates (501, 509) is any one of the pixels Pcpt2. As to another unit record Rnt including coordinate values (324, 831) there are two ID numbers #1 and #2 assigned. Thus, a pixel corresponding to the pixel Pst at the coordinates (324, 831) is selected each from the pixels Pcpt1 and Pcpt2, and thus selected two pixels are used to determine the value of the pixel Pst.

As described in the foregoing, the coordinate values (ua, va) specify the pixels Pcpt1 and Pcpt2 in the captured images Scpt1 and Scpt2. Thus specified pixels Pcpt1 and/or Pcpt2 is used to determine the value of the pixel Pst at the coordinates (ub, vb) in the unit record Rnt. Note here that the coordinate values (ua, va) has a one-to-one relationship with the ID number. Thus, the unit record Ant with two ID numbers includes two sets of coordinate values (ua, va). In this case, the value of the pixel Pst at the coordinates (ub, vb) is determined by using the pixels Pcpt1 and Pcpt2.

Figure 14:
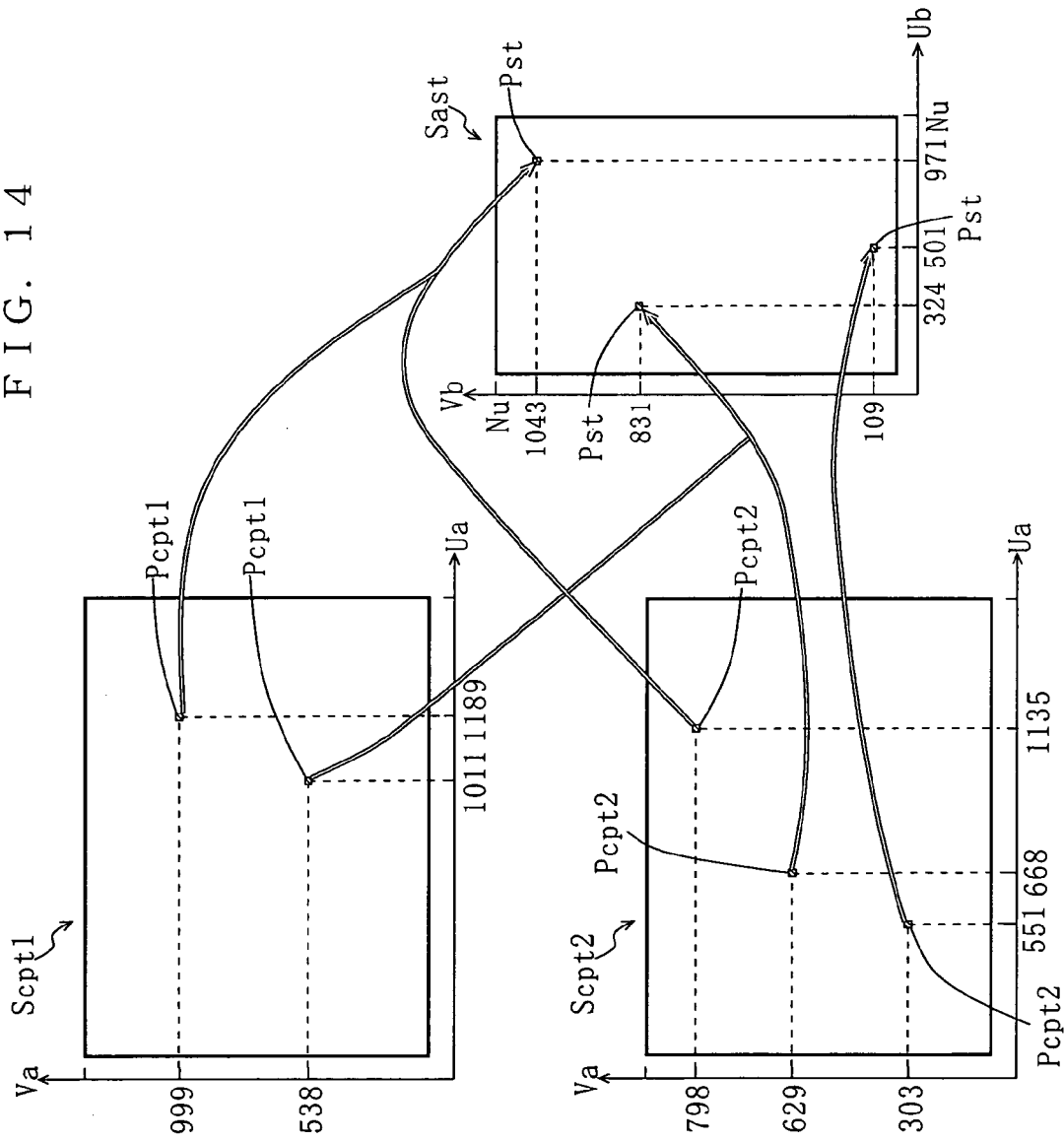
FIG. 14 is a diagram for exemplarily illustrating in detail the image processing carried out by the CPU 7 of FIG. 1.

In more detail, the value of the pixel Pst at the coordinates (ub, vb) is determined based on both the ID number and the coordinate values (ua, va) in the same unit record Rnt. As an example, the unit record Rnt including the coordinate values (501, 109) indicates the ID number #2 and one set of coordinate values (551, 303) as (ua, va). As shown in FIG. 14, the value of the pixel Pst at the coordinates (501, 109) is thus determined by one pixel Pcpt2 at the coordinates (551, 303) in the captured image Scpt2.

As another example, the unit record Rnt including the coordinate values (324, 831) indicates the combination of ID number #1 and a set of coordinate values (1011, 538) as (ua, va) and another combination of ID number #2 and a set of coordinate values (668, 629). As shown in FIG. 14, the value of the pixel Pst at the coordinates (324, 831) is thus determined by one pixel Pcpt1 at the coordinates (1011, 538) in the captured image Scpt1, and one pixel Pcpt2 at the coordinates (668, 629) in the captured image Scpt2.

As still another example, the unit record Rnt including coordinate values (971, 1043) indicates the combination of ID number #1 and a set of coordinate values (1189, 999) as (ua, va), and another combination of ID number #2 and a set of coordinate values (1135, 798). As shown in FIG. 14, the value of the pixel Pst at the coordinates (971, 1043) is thus determined by one pixel Pcpt1 at the coordinates (1189, 999)

in the captured image Scpt1, and one pixel Pcpt2 at the coordinates (1135, 798) in the captured image Scpt2.

As described above, in the unit record Rnt assigned to the pixel Pst belonging to the overlapped region Rr2, the record type Trcd indicates "2". In FIG. 13, to only those record units Rnt showing "2" in their record types Trcd, the steering angle range Rrng is written. Specifically, every ID number accompanies two ranges of Rrng1 and Rrng2. The range Rrng1 is $0<=\rho<=\rho th$, and the range Rrng2 is $\rho>\rho th$. Here, $\rho th$ denotes a threshold value, which is determined in the following manner and not equal among the unit records Rnt.

Figure 15C:
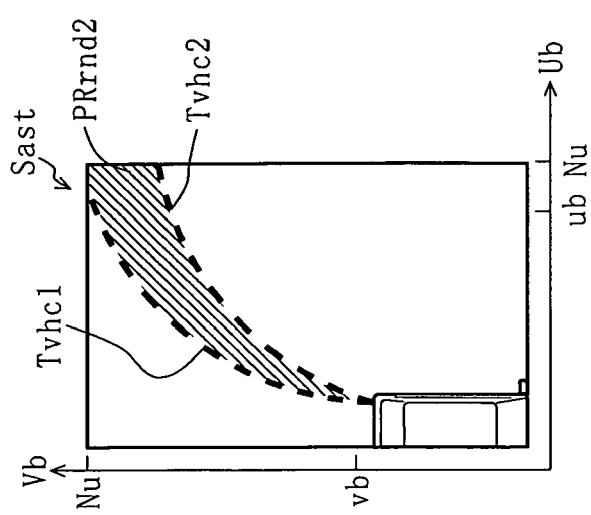
FIGS. 15B and 15C show partial rendering regions PRrnd1 and PRrnd2, respectively.
Figure 15B:
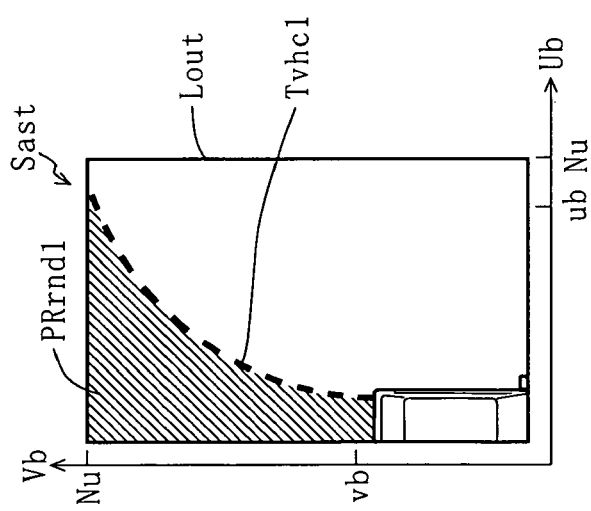
Figure 15A:
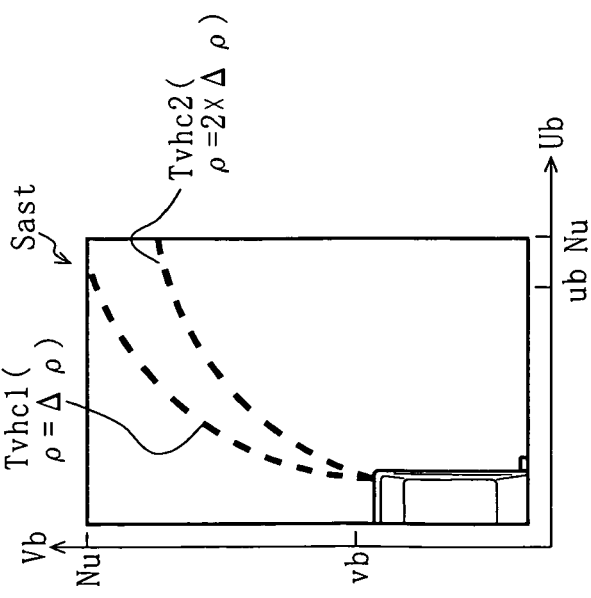
FIG. 15A is a diagram showing an exemplary estimated trajectory Tvhc in the drive assistant image Sast.

Here, the above-described estimated trajectory Tvhc can be derived in advance under the technique typified by the well-known Ackermann's model, and determined based on the steering angle $\rho$. Such estimated trajectory Tvhc is represented in the world coordinate which defines the actual space. Therefore, by converting the trajectory Tvhc through the coordinate conversion processing into the one representable in the second UV coordinate system, the position for rendering the estimated trajectory Tvhc in the drive assistant image Sast can be known in advance. Assuming that the steering angle $\rho$ is increased from 0 degree by $\Delta\rho$ degrees ($\Delta\rho$ has a positive value), as shown in FIG. 15A, several estimated trajectories Tvhc1, Tvhc2, . . . (shown are two) are represented in the second UV coordinate system. Here, the value $\Delta\rho$ is determined based on the design specifications of the drive assistant device Uast1, and the smaller would be the more preferable.

In FIG. 15A, the estimated trajectory Tvhc1 is the one derived when the steering angle $\rho$ is $\Delta\rho$, and the estimated trajectory Tvhc2 when $2\times\Delta\rho$. As shown in FIG. 15B, when the steering angle $\rho$ is $\Delta\rho$, formed in the rendering region Rrnd is a partial rendering region PRrnd1 enclosed by an outline Lout of the rendering region Rrnd, the longitudinal median plane Flm, and the estimated trajectory Tvhc1. Here, the outline Lout is defined by the longitudinal median plane Flm, the lateral datum plane Ftr, and the sides L1*st* and L2*nd* shown in FIG. 8. When the steering angle $\rho$ is $2\times\Delta\rho$, formed in the rendering region Rrnd is a partial rendering region PRrnd2 enclosed by the outline Lout, and the estimated trajectories Tvhc1 and Tvhc2 as shown in FIG. 15C. Here, when the steering angle $\rho$ is $j\times\Delta\rho$, a partial rendering region PRrndj is formed similarly to the partial rendering region PRrnd2. Here, j is a natural number being 3 or larger.

In the mapping table Tmp of FIG. 13, in the unit record Rnt including the coordinate values (ub, vb) belonging to the partial rendering region PRrnd1, the range Rrng1 indicates $0<=\rho<=\Delta\rho$, and the range Rrng2 indicates $\rho>\Delta\rho$. In such unit record Rnt, the threshold $\rho th$ is $\Delta\rho$. As an exemplary set of coordinate values belonging to the partial rendering region PRrnd1, FIG. 13 shows the unit record Rnt including the coordinates (324, 831).

In the unit record Rnt including the coordinate values (ub, vb) belonging to the partial rendering region PRrnd2, the range Rrng1 indicates $0<=\rho<=2\times\Delta\rho$, and the range Rrng2 indicates $\rho>2\times\Delta\rho$. In such unit record Rnt, the threshold $\rho th$ is $2\times\Delta\rho$. As an exemplary set of coordinate values belonging to the partial rendering region PRrnd2, FIG. 13 shows the unit record Rnt including the coordinates (971, 1043).

In the unit record Rnt including the coordinate values (ub, vb) belonging to the partial rendering region PRrndj, the range Rrng1 indicates $0<=\rho<=j\times\Delta\rho$, and the range Rrng2 indicates $\rho>j\times\Delta\rho$.

The blending ratio Rbrd is a parameter for specifying the value of the pixel Pst at the coordinates (ub, va), and multiplied by the value of the pixel Pcpt1 or Pcpt2 at the coordinates (ua, va). In this embodiment, the blending ratio Rbrd takes either 0 or 1 for convenience. In the unit record Rnt showing "2" in the record type Trcd, the blending ratio Rbrd is set to both the ranges Rrng1 and Rrng2. That means such unit record Rnt carries 4 blending ratios Rbrd1 to Rbrd4 in total. To be more specific, to the range Rrng1 corresponding to the ID number #1, two blending ratios Rbrd1 and Rbrd3 are assigned. As to the range Rrng2 corresponding to the ID number #2, two blending ratios Rbrd2 and Rbrd4 are assigned.

For example, as shown in FIG. 13, the value of the pixel Pst at the coordinates (501, 109) is calculated by multiplying the blending ratio Rbrd of 1 by the value of the pixel Pcpt2 at the coordinates (551, 303) in the captured image Scpt2. As to the pixel Pst at the coordinates (324, 831) when the rudder angle steering $\rho$ is in the range Rrng1, its value is calculated by adding two resulting values obtained by multiplying the blending ratio Rbrd1 of 0 by the value of the pixel Pcpt1 at the coordinates (1011, 538) in the captured image Scpt1; and multiplying the blending ratio Rbrd3 of 1 by the value of the pixel Pcpt2 at the coordinates (668, 629) in the captured image Scpt2. If the steering angle $\rho$ is in the range Rrng2, multiply the blending ratio Rbrd2 of 1 by the value of the pixel Pcpt2 at the coordinates (1011, 538) in the captured image Scpt1; and multiply the blending ratio Rbrd4 of 0 by the value of the pixel Pcpt2 at the coordinates (668, 629) in the captured image Scpt2. The resulting two values are then added to each other.

For realizing such calculation, in one unit record Rnt, the blending ratios Rbrd1 and Rbrd2 are set not to take the same values. The same is applicable to the blending ratios Rbrd3 and Rbrd4.

For example, in the unit record Rnt including the coordinate values (324, 831), to the ID number #1, the blending ratios Rbrd1 and Rbrd2 respectively indicate 0 and 1. To the ID number #2, the blending ratios Rbrd3 and Rbrd4 also respectively indicate 1 and 0. Similarly, in the unit record Rnt including the coordinate values (971, 1043), to the ID number #1, the blending ratios Rbrd1 and Rbrd2 respectively indicate 0 and 1, and to the ID number #2, the blending ratios Rbrd3 and Rbrd4 respectively indicate 1 and 0.

Figure 16:
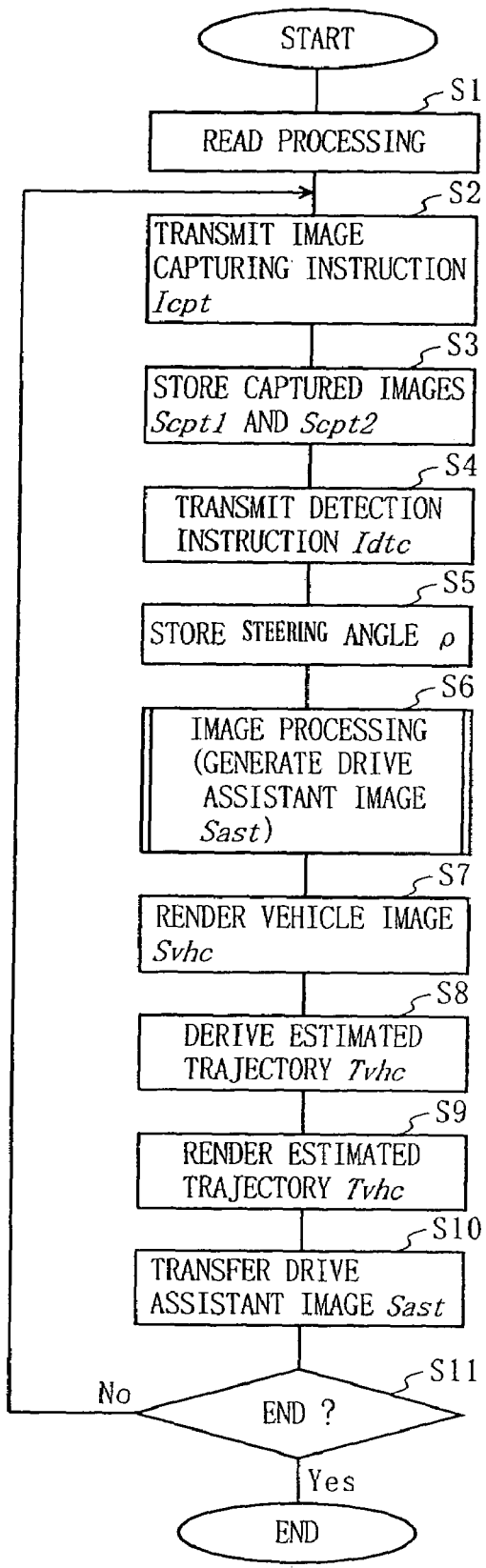
FIG. 16 is a flowchart showing the processing procedure written in a program PG1 of FIG. 1.

Described next is the operation of the above drive assistant device Uast1. When the driver wants assistance by the drive assistant device Uast1, for example, to check in what state the left-rear area of the vehicle Vur is, the CPU 7 starts executing the program PG1. Here, FIG. 16 is a flowchart showing the processing procedure in the CPU 7 written in the program PG1. The CPU 7 first reads the vehicle image Svhc, and the mapping table Tmp from the ROM 8 to the RAM 9 (step S1). As storing the mapping table Tmp and the vehicle image Svhc, the RAM 9 exemplarily works as a table storing part and an image storing part.

Then, the CPU 7 generates an image capturing instruction Icpt, and transmits it to the image capture devices 1 and 2 (step S2). The image capturing instruction Icpt is a signal instructing the image capture devices 1 and 2 for image capturing. In response to the capturing instruction Icpt, the image capture devices 1 and 2 capture the above-described captured images Scpt1 and Scpt2, and store those images in the image buffers IBcpt1 and IBcpt2, respectively (step S3). As storing the captured images Scpt1 and Scpt2 in step S3, the CPU 7 exemplarily works as an image receiving part.

The CPU 7 then generates a detection instruction Idtc, and transmits it to the steering angle sensor 3 (step S4). The detection instruction Idtc is a signal instructing the steering angle sensor 3 to detect the steering angle $\rho$. In response to the detection instruction Idtc, the steering angle sensor 3 detects the steering angle ρ, and stores it in the RAM 9 (step S5). As receiving the steering angle ρ in step S5, the CPU 7 exemplarily works as a steering angle receiving part.

The CPU 7 then executes image processing according to the mapping table Tmp on the RAM 9, and generates a drive assistant image Sast from the captured images Scpt1 and Scpt2 in the image buffers IBcpt1 and IBcpt2 (step S6). In step S6, the CPU 7 exemplarily works as an image processing part.

Figure 17:
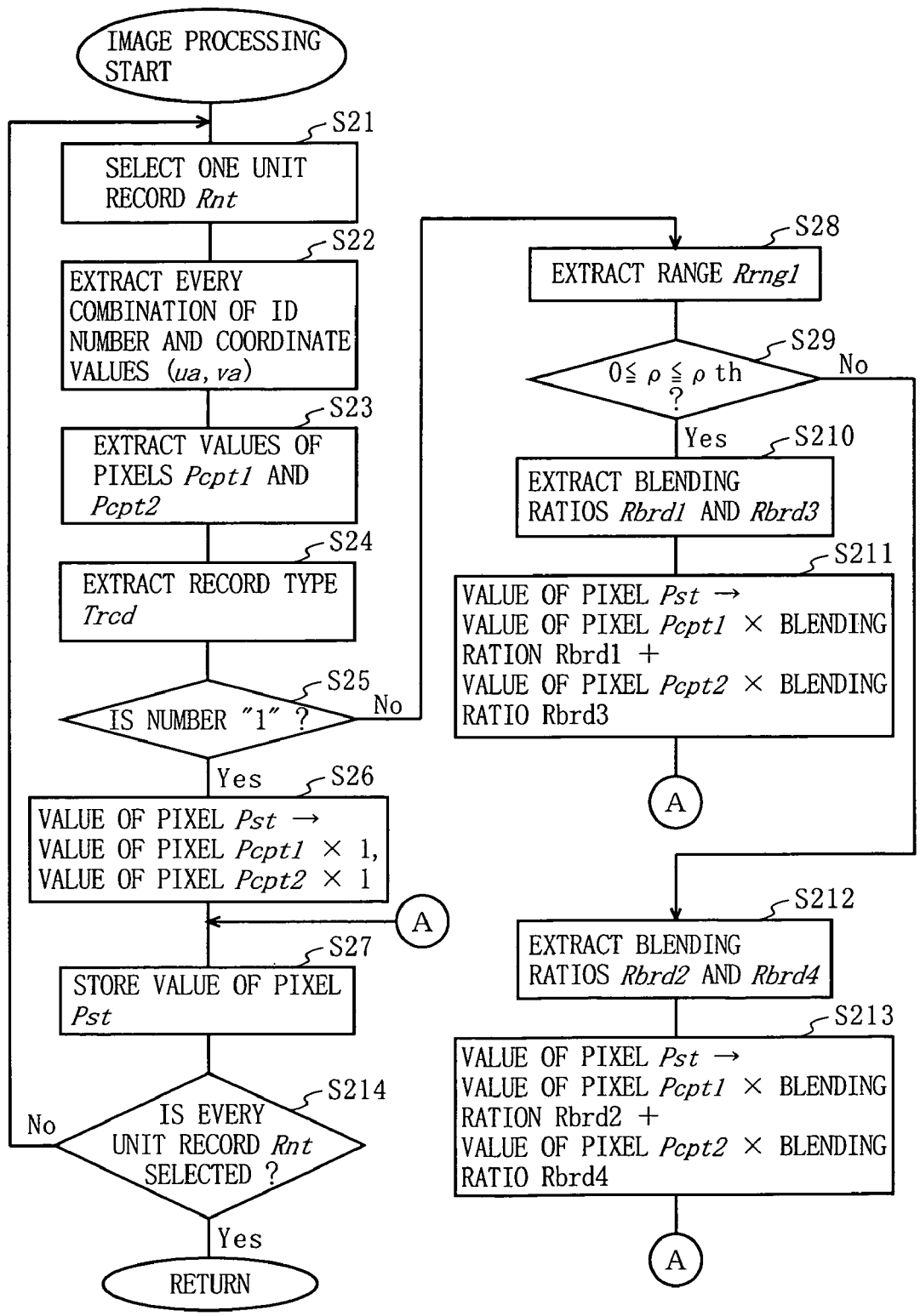
FIG. 17 is a flowchart showing the detailed procedure in step S6 of FIG. 16.
Figure 18:
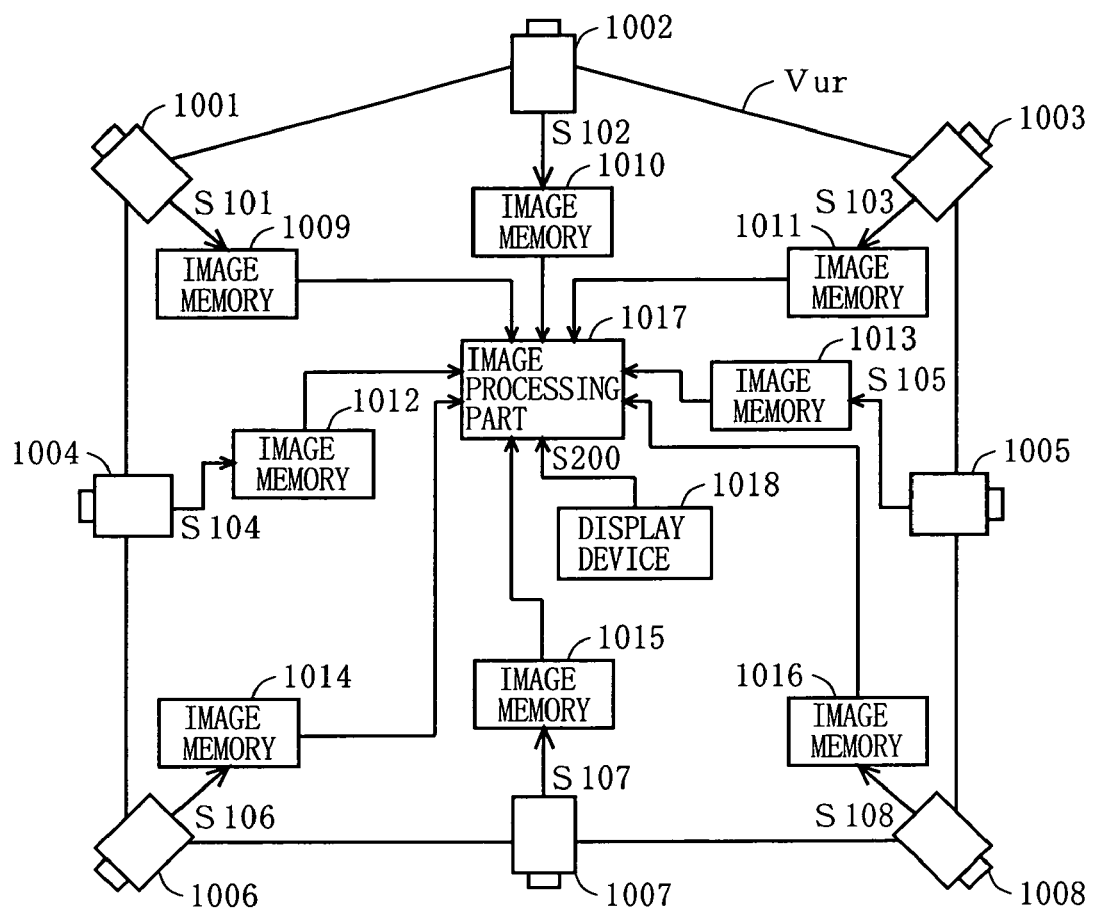
FIG. 18 is a block diagram showing the structure of a drive assistant device disclosed in Japanese Patent Laid-Open Publication No. 11-78692 (1999-78692)
Figure 19:
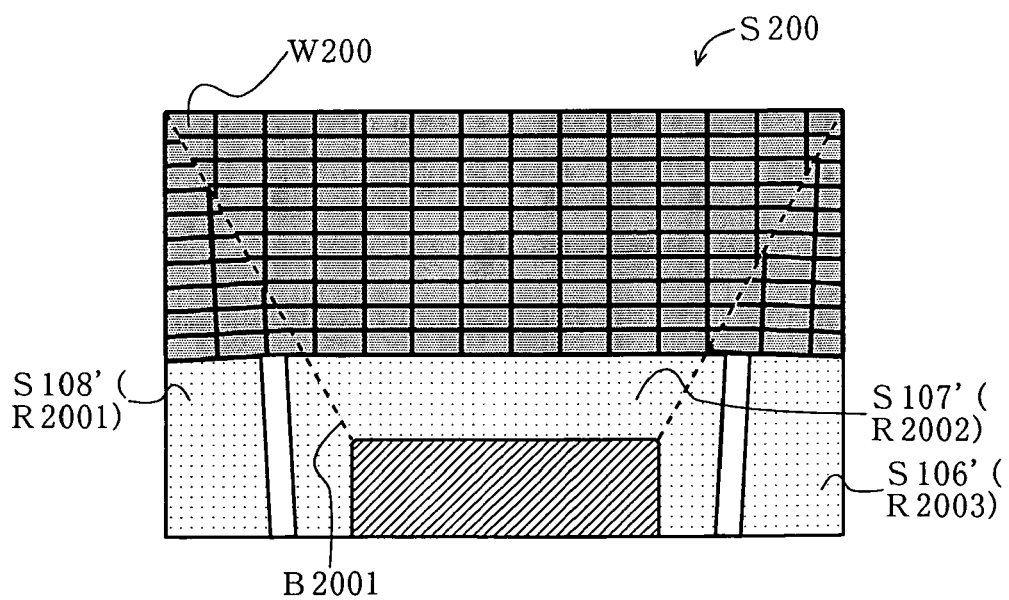
FIG. 19 is a diagram showing an exemplary surrounding image S200 generated by the drive assistant device of FIG. 18.
Figure 20A:
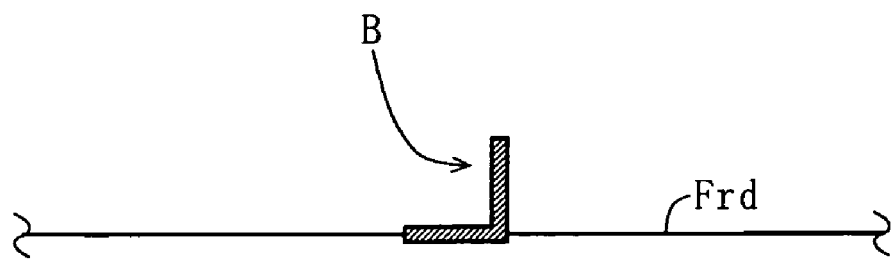
FIGS. 20A and 20B are diagrams for illustrating a problem unsolved by a drive assistant device disclosed in International Publication WO00-07373.
Figure 20B:
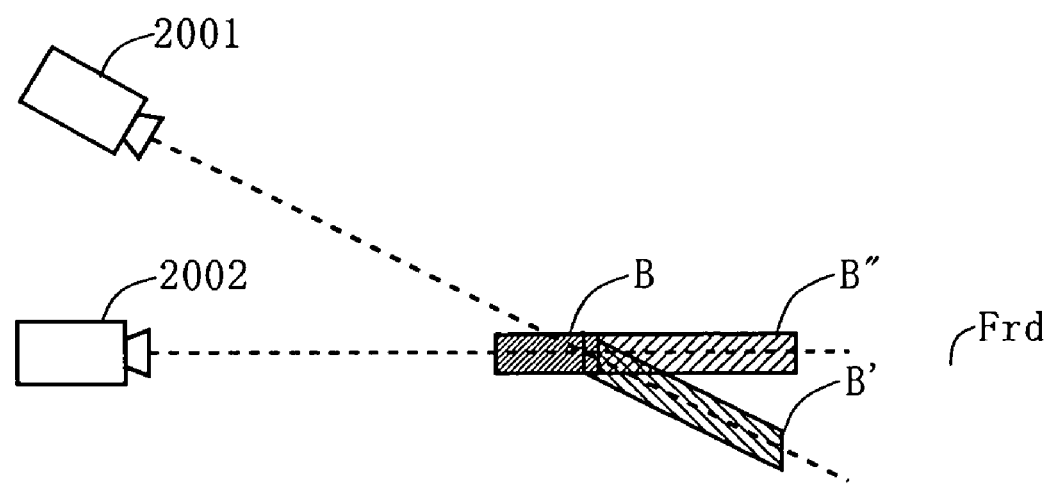

More specifically, the CPU 7 selects, based on the steering angle ρ detected in step S4, several pixels Pcpt1 and Pcpt2 from the captured images Scpt1 and Scpt2 according to the mapping table Tmp. Based on those selected, the CPU 7 then determines a value for each of the pixels Pst in the drive assistant image Sast. Here, refer to FIG. 17 for a flowchart showing the detailed procedure in step S6. In FIG. 17, the CPU 7 selects one unit record Rnt from the mapping table Tmp (step S21), and extracts every combination of the ID number and the coordinate values (ua, va) therefrom (step S22). Then, from the image buffers IBcpt1 and/or IBcpt2 specified by the extracted ID number(s), the CPU 7 takes out value of the pixel Pcpt1 and/or Pcpt2 specified by the extracted coordinate values (ua, va) (step S23).

Here, assuming that selected in step S21 is the unit record Rnt wherein the coordinate values (ub, vb) are (501, 109). Under this assumption, extracted in step S22 is the combination of the ID number #2 and the coordinate values (551, 303). Accordingly, extracted in step S23 is the value of the pixel Pcpt2 at the coordinates (551, 303) from the captured image Scpt2 stored in the image buffer IBcpt2.

Also, assuming that selected in step S21 is the unit record Rnt wherein the coordinate values (ub, vb) are (324, 831). Under this assumption, extracted in step S22 are two combinations of the ID number #1 and the coordinate values (1011, 538), and the ID number #2 and the coordinate values (668, 629). Accordingly, extracted in step S23 are the value of the pixel Pcpt1 at the coordinates (1011, 538) and the value of the pixel Pcpt2 at the coordinates (668, 629).

Assuming that selected in step S21 is the unit record Rnt wherein the coordinate values (ub, vb) are (971, 1043). Under this assumption, extracted in step S22 are two combinations of the ID number #1 and the coordinate values (1189, 999), and the ID number #2 and the coordinate values (1135, 798). Accordingly, extracted in step S23 are the value of the pixel Pcpt1 at the coordinates (1189, 999) and the value of the pixel Pcpt2 at the coordinates (1135, 798).

After step S23 is through, the CPU 7 extracts the number of the record type Trcd from the unit record Rnt selected in step S21 (step S24), and determines whether the extracted number is "1" (step S25). If determined Yes, the CPU 7 multiplies the blending ratio Rbrd of 1 by the value of the pixel Pcpt1 or Pcpt2 extracted in step S23, and determines the value of the pixel Pst at the coordinates (ub, vb) specified by the record unit Rnt selected in step S21 (step S26). The CPU 7 then stores the value of the pixel Pst in the frame memory FMast (see FIG. 9) (step S27).

Here, when selected in step S21 is the unit record Rnt wherein the coordinate values (ub, vb) are (501, 109), step S26 is carried out. In step S26, the value of the pixel Pcpt2 at the coordinates (551, 303) in the captured image Scpt2 is multiplied by the blending ratio Rbrd of 1. By this multiplication, the value of the pixel Pst at the coordinates (501, 109) is determined, and stored in the frame memory FMast.

In step S25, if the record type Trcd is determined as showing "2", the CPU 7 extracts the range Rrng1 from the unit record Rnt selected in step S21 (step S28). Then, the CPU 7 determines whether the steering angle ρ detected in step S5 is in the range Rrng1 extracted in step S28 (step S29). If determined Yes, the CPU 7 then extracts the blending ratios Rbrd1 and Rbrd3 assigned to the range Rrng1 (step S210).

Here, the record type Trcd indicating "2" means that the two pixels Pcpt1 and Pcpt2 are selected in step S22. As described by referring to FIG. 13, the pixels Pcpt1 and Pcpt2 are assigned the blending ratios Rbrd1 and Rbrd3 to be used for the range Rrng1. After step S211 is through, the CPU 7 determines the value of the pixel Pst at the coordinates (ub, vb) specified by the unit record Rnt selected in step S21 (step S211). Specifically, the value is calculated by adding two resulting values obtained by multiplying the blending ratio Rbrd1 by the value of the pixel Pcpt1; and multiplying the blending ratio Rbrd3 by the value of the pixel Pcpt2. The procedure then goes to step S27, and the CPU 7 stores thus determined value of the pixel Pst in the frame memory FMast (see FIG. 9).

For example, if selected in step S21 is the unit record Rnt wherein the coordinate values (ub, vb) are (324, 831), step S28 is carried out. Here, assuming that the steering angle ρ detected in step S5 satisfies 0<=ρ<=Δρ, extracted in step S210 are 0 and 1 as the blending ratios Rbrd1 and Rbrd3. Then in step S211, a value obtained by multiplying the blending ratio Rbrd1 of 0 by the value of the pixel Pcpt1 at the coordinates values (1011, 538) and a value obtained by multiplying the blending ratio Rbrd3 of 1 by the value of the pixel Pcpt2 at the coordinates values (668, 629) are added together. The resulting value is the value of the pixel Pst at the coordinates value (324, 831), and stored in the frame memory FMast in step S27.

As another example, if selected in step S21 is the unit record Rnt wherein the coordinate values (ub, vb) are (971, 1043), step S28 is also carried out. Here, assuming that the steering angle ρ detected in step S5 satisfies 0<=ρ<=Δρ, extracted in step S210 are 0 and 1 as the blending ratios Rbrd1 and Rbrd3. Then in step S211, a value obtained by multiplying the blending ratio Rbrd1 of 0 by the value of the pixel Pcpt1 at the coordinates values (1189, 999) and a value obtained by multiplying the blending ratio Rbrd3 of 1 by the value of the pixel Pcpt2 at the coordinates values (1135, 798) are added together. The resulting value is the value of the pixel Pst at the coordinates value (971, 1043), and stored in the frame memory FMast in step S27.

In step S29, if the steering angle ρ is determined as not in the range Rrng1, the CPU 7 extracts the blending ratios Rbrd2 and Rbrd4 assigned to the Rrng2 from the unit record Rnt selected in step S21 (step S212). As described above by referring to FIG. 14, the blending ratios Rbrd2 and Rbrd4 are multiplied to the pixels Pcpt1 and Pcpt2 when the steering angle ρ is in the range Rrng2. After step S212 is through, the CPU 7 adds a value obtained by multiplying the blending ratio Rbrd2 by the value of the pixel Pcpt1 and a value obtained by multiplying the blending ratio Rbrd4 by the value of the pixel Pcpt2 together. The resulting value is determined as the value of the pixel Pst at the coordinates value (ub, vb) specified by the unit record Rnt selected in step S21 (step S213). The procedure then goes to step S27, and the CPU 7 stores thus determined value of the pixel Pst in the frame memory FMast (see FIG. 9).

The CPU 7 repeats the procedure in steps S21 to S213 until every unit record Rnt in the mapping table Tmp is selected (step S214). After the processing is through, the drive assistant image Sast (see FIG. 10) is generated for one frame. In the processing, assuming that the steering angle ρ stored in step S4 is Δρ, the value of the pixel Pst belonging to the partial rendering region PRrnd1 in the drive assistant image Sast is determined only by the captured image Scpt1. Other than the partial rendering region PRrnd1, the value of the pixel Pst is determined only by the captured image Scpt2. In other words, in the drive assistant image Sast, the value of the pixel Pst is determined based on both the captured images Scpt1 and Scpt2 with reference to the estimated trajectory Tvhc1. Therefore, the drive assistant image Sast has such characteristic as follows. Generally, the driver of the vehicle Vur avoids obstacles blocking his/her way, and thus the obstacle is hardly located in the close range to the vehicle Vur but often a little away therefrom. Therefore, if the CPU 7 determines the value of the pixel Pst based on the captured images Scpt1 and Scpt2 depending on whether the pixel Pst is in the partial rendering region PRrnd1, there is a little possibility of the obstacle lying on the estimated trajectory Tvhc. Accordingly, the drive assistant image Sast hardly bears such problem of the conventional drive assistant devices. As such, the problem unsolved by the conventional drive assistant devices (those disclosed in Japanese Patent Laid-Open Publication No. 11-78692 (1999-78692) and in International Publication WO00-07373) are now clearly solved, and thus the drive assistant image Sast provided by the rendering device Urnd1 barely causing the driver to feel strange.

Once the CPU 7 determines that every unit record Rnt is selected in step S214, this is the end of the processing in FIG. 17, and the procedure goes to step S7 in FIG. 16. Here, due to the mounting positions of the image capture devices 1 and 2, the vehicle Vur hardly appears in the captured images Scpt1 and Scpt2. This is the reason why the drive assistant image Sast generated in step S6 does not include the vehicle Vur. After the procedure completing the processing in FIG. 17, the CPU 7 thus renders the vehicle image Svhc on the RAM 9 onto the overlaying position Pvy on the drive assistant image Sast (step S7). In step S7, the CPU 7 exemplarily works as a vehicle rendering part.

Then, the CPU 7 derives the above-mentioned estimated trajectory Tvhc based on the rudder angle ρ stored in step S7 under the technique typified by the Ackermann's model (step S8) The CPU 7 then renders thus derived estimated trajectory Tvhc on the drive assistant image Sast processed in step S7 (step S9). In steps S8 and S9, the CPU 7 exemplarily works as a trajectory deriving part. Assuming here that the steering angle ρ stored in step S4 is Δρ, rendered is such estimated trajectory Tvhc1 as described referring to FIG. 15A, whereby the resulting drive assistant image Sast looks as the one shown in FIG. 10.

Then, the CPU 7 transfers the drive assistant image Sast on the frame memory FMast to the display device 4 for display thereon (step S10). By seeing such drive assistant image Sast displayed on the display device 4, the driver can understand in what state the area left rear of the vehicle Vur is, especially his/her blind spots. As such, the driver thus can drive his/her vehicle Vur with safety.

Thereafter, the CPU 7 determines whether now is the time to end the processing in FIG. 16 (step S11). If determined not yet, the procedure returns to step S2 to generate another drive assistant image Sast on the frame memory FMast.

At this point in time, assume that the driver turns the steering wheel and the steering angle ρ is now 2×Δρ. Under this assumption, with the above-described processing in FIG. 16 carried out, the value of the pixel Pst belonging to the partial rendering regions PRrnd1 and PRrnd2 in the drive assistant image Sast is determined only by the captured image Scpt1. Other than the partial rendering regions PRrnd1 and PRrnd2, the value of the pixel Pst is determined only by the captured image Scpt2. In other words, in the drive assistant image Sast, the value of the pixel Pst is determined based on both the captured images Scpt1 and Scpt2 with reference to the estimated trajectory Tvhc2. For example, as shown in FIG. 13, the value of the pixel Pst at the coordinates (501, 109) is determined as being the value of the pixel Pcpt2 at the coordinates (551, 303) regardless of the steering angle ρ.

As to the pixel Pst at the coordinates (324, 831), if the steering angle ρ is 2×Δρ, the range Rrng1 is not applicable. Thus, step S212 is carried out. In such case, the value of the pixel Pst is calculated by adding two resulting values obtained by multiplying the blending ratio Rbrd2 of 1 by the value of the pixel Pcpt1 at the coordinates (1011, 538); and multiplying the blending ratio Rbrd4 of 0 by the value of the pixel Pcpt2 at the coordinates (668, 629).

As to the pixel Pst at the coordinates (971, 1043), if the steering angle ρ is 2×Δρ, the range Rrng1 is still applicable. Thus, step S26 is carried out.

In the above embodiment, for the sake of simplification, the drive assistant image Sast shows the area left rear of the vehicle Vur viewed from the virtual camera Cv (see FIG. 11). This is not restrictive, and the range covered by the drive assistant image Sast may be freely determined by the design specifications of the vehicle Vur. For example, the drive assistant device Uast1 may show the entire area around the vehicle Vur, or only the area rear of the vehicle Vur. Further, the drive assistant image Sast may be generated simply by stitching the captured images Scpt1 and Scpt2 without the viewpoint conversion processing as disclosed in Japanese Patent Laid-Open Publication No. 11-78692 (1999-78692) mentioned in Background Art.

Further, in the above embodiment, the value of the pixel Pst is determined based on the values of the pixels Pcpt1 and Pcpt2 with reference to the estimated trajectory Tvhc. Here, the estimated trajectory Tvhc is not necessarily used as the reference, and a line which is moved by a predetermined amount parallel to the estimated trajectory Tvhc may be used. Alternatively, a chord of the estimated trajectory Tvhc may be used.

In the above embodiment, the program PG1 is stored in the rendering device Urnd1. This is not restrictive, and the program PG1 may be distributed in a recording medium typified by CD-ROM, or over a communications network such as the Internet.

While the invention has been described in detail, the foregoing description is in all aspects illustrative and not restrictive. It is understood that numerous other modifications and variations can be devised without departing from the scope of the invention.

What is claimed is:

1. A rendering device for generating a drive assistant image of an area around a vehicle for drive assistance, said device comprising:

an image receiving part operable to receive images captured by a plurality of image capture devices, which are fixed in the vehicle respectively, operable to capture images of the area around the vehicle, the captured images include at least one overlapped region;

a steering angle receiving part operable to receive a steering angle of the vehicle detected by a steering angle sensor fixed in the vehicle;

a trajectory deriving part operable to derive an estimated trajectory for the vehicle to take based on the steering angle received by said steering angle receiving part; and an image processing part operable to perform pixel selection from the captured images received by said image receiving part according to the steering angle received by said steering angle receiving part, and based on a result of the pixel selection, to generate the drive assistant image, wherein if the estimated trajectory derived by said trajectory deriving part is designated over an overlapped region, said image processing part is operable to select pixels from a captured image received by said image receiving part representing one side of the overlapped region with respect to an imaginary line, and to select pixels from another captured image representing the other side of the overlapped region with respect to the imaginary line, and the imaginary line is one selected from a group including the estimated trajectory, a line displaced by a predetermined amount parallel to the estimated trajectory, and a chord of the estimated trajectory.

2. The rendering device according to claim 1, further comprising a table storing part operable to store a mapping table showing a correspondence between the drive assistant image and the captured images on a pixel basis, wherein in the mapping table, a pixel belonging to the overlapped region in the drive assistant image corresponds to a plurality of pixels in the captured images according to the steering angle received by said steering angle receiving part, and according to the mapping table stored in said table storing part, said image processing part selects the pixels from each of the captured images received by said image receiving part.

3. The rendering device according to claim 1, further comprising:

a trajectory rendering part operable to render the estimated trajectory derived by said trajectory deriving part on the drive assistant image generated by said image processing part.

4. The rendering device according to claim 1, further comprising:

an image storing part operable to store a vehicle image representing the vehicle; and a vehicle rendering part operable to render the vehicle image stored in said image storing part on the drive assistant image generated by said image processing part.

5. The rendering device according to claim 1, wherein said image processing part generates the drive assistant image showing the area around the vehicle viewed from a predetermined virtual camera.

6. A rendering method for generating a drive assistant image of an area around a vehicle for drive assistance, said method comprising:

receiving images captured by a plurality of image capture devices, which are fixed in the vehicle respectively, operable to capture images of the area around the vehicle, the captured images include at least one overlapped region;

receiving a steering angle of the vehicle detected by a steering angle sensor fixed in the vehicle;

deriving an estimated trajectory for the vehicle to take based on the received steering angle; and performing pixel selection from the received images according to the received steering angle, and based on a result of the pixel selection, generating the drive assistant image, wherein if the estimated trajectory is designated an overlapped region, in said pixel selection, pixels are selected from a captured image representing one side of the overlapped region with respect to an imaginary line, and pixels are selected from another captured image representing the other side of the overlapped region with respect to the imaginary line, and the imaginary line is one selected from a group including the estimated trajectory, a line displaced by a predetermined amount parallel to the estimated trajectory, and a chord of the estimated trajectory.

7. The rendering method according to claim 6, further comprising storing a mapping table showing a correspondence between the drive assistant image and the captured images on a pixel basis, wherein in the mapping table, a pixel belonging to the overlapped region in the drive assistant image corresponds to a plurality of pixels in the captured images according to the received steering angle, and according to the stored mapping table, in said pixel selection, the pixels are selected from each of the received images.

8. A recording medium having a program recorded thereon for generating a drive assistant image of an area around a vehicle for drive assistance, said program including system readable instructions capable of instructing a system to perform the method comprising:

receiving images captured by a plurality of image capture devices, which are fixed in the vehicle respectively, operable to capture images of the area around the vehicle, the captured images include at least one overlapped region;

receiving a steering angle of the vehicle detected by a steering angle sensor fixed in the vehicle;

deriving an estimated trajectory for the vehicle to take based on the received steering angle; and performing pixel selection from the received images according to the steering angle, and based on a result of the pixel selection, generating the drive assistant image, wherein if the estimated trajectory is designated an overlapped region, in said pixel selection, pixels are selected from a captured image representing one side of the overlapped region with respect to an imaginary line, and pixels are selected from another captured image representing the other side of the overlapped region with respect to the imaginary line, and the imaginary line is one selected from a group including the estimated trajectory, a line displaced by a predetermined amount parallel to the estimated trajectory, and a chord of the estimated trajectory.

9. The recording medium having the program recorded thereon according to claim 8, further including system readable instructions capable of instructing a system to additionally store a mapping table showing a correspondence between the drive assistant image and the captured images on a pixel basis, wherein in the mapping table, a pixel belonging to the overlapped region in the drive assistant image corresponds to a plurality of pixels in the captured images according to the received steering angle, and according to the stored mapping table, in said pixel selection, the pixels are selected from each of the received captured images.

* * * * *